United States Patent
Sasaki et al.

[11] Patent Number: 5,195,693
[45] Date of Patent: Mar. 23, 1993

[54] TENSION REDUCER

[75] Inventors: Hironori Sasaki; Hisao Yamada, both of Aichi, Japan

[73] Assignee: Kabushiki Kaisha Tokai-Rika-Denki Seisakusho, Aichi, Japan

[21] Appl. No.: 675,429

[22] Filed: Mar. 26, 1991

[30] Foreign Application Priority Data

Mar. 29, 1990 [JP] Japan .................................. 2-33199
Mar. 29, 1990 [JP] Japan .................................. 2-33200

[51] Int. Cl.$^5$ ............................................. B60R 22/44
[52] U.S. Cl. .................................................. 242/107
[58] Field of Search ......... 242/107, 107.4 R, 107.4 A, 242/107.4 B; 280/806, 807

[56] References Cited

U.S. PATENT DOCUMENTS

| | | | |
|---|---|---|---|
| 4,113,201 | 9/1978 | Ziv | 242/107 |
| 4,913,372 | 4/1990 | Takada | 242/107 |
| 4,943,011 | 7/1990 | Kitamura et al. | 242/107 |
| 4,993,657 | 2/1991 | Brown | 242/107 |

Primary Examiner—John M. Jillions
Attorney, Agent, or Firm—Sixbey, Friedman, Leedom & Ferguson

[57] ABSTRACT

Disclosed herein is a tension reducer suitable for use in a webbing retractor, which comprises a weak resilient spiral spring whose one end is connected to a webbing take-up spindle of the webbing retractor and which exerts an urging force in a webbing winding direction, a connecting member connected to the other end of the weak resilient spiral spring and disposed rotatably about the take-up spindle, a strong resilient spiral spring whose one end is connected to the connecting member and which exerts an urging force in the webbing winding direction greater than the urging force of the weak resilient spiral spring, a device for stopping the rotation of the connecting member in the webbing winding direction so as to avoid the exertion of the urging force of the strong resilient spiral spring on a webbing at the time that the webbing is pulled out of the take-up spindle to be fastened to an occupant, and a device disposed about the take-up spindle for controlling the degree of tightening of the windings of the weak resilient spiral spring so as to prevent the torque thereof from exceeding a predetermined range.

19 Claims, 8 Drawing Sheets

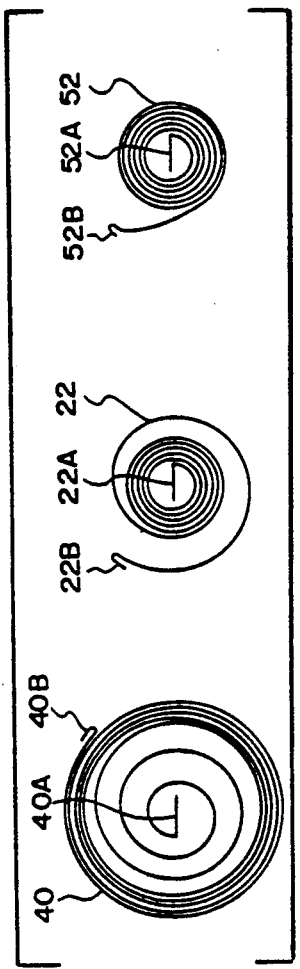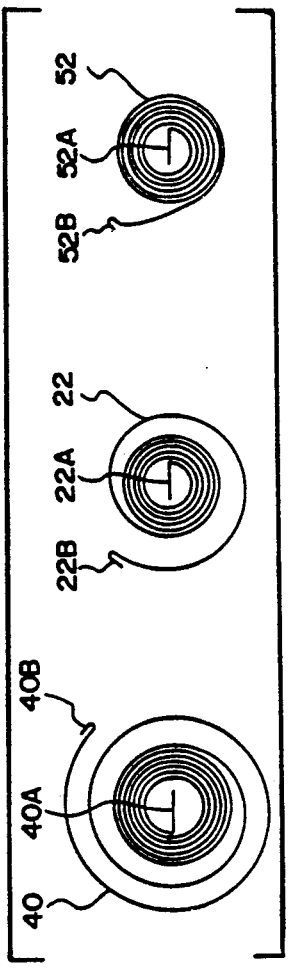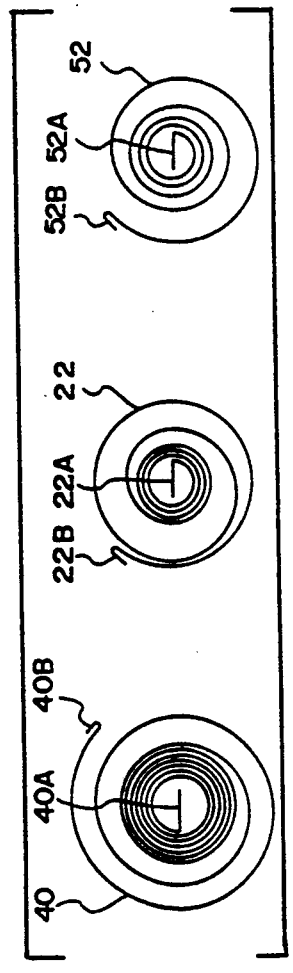
FIG. 3A
FIG. 3B
FIG. 3C

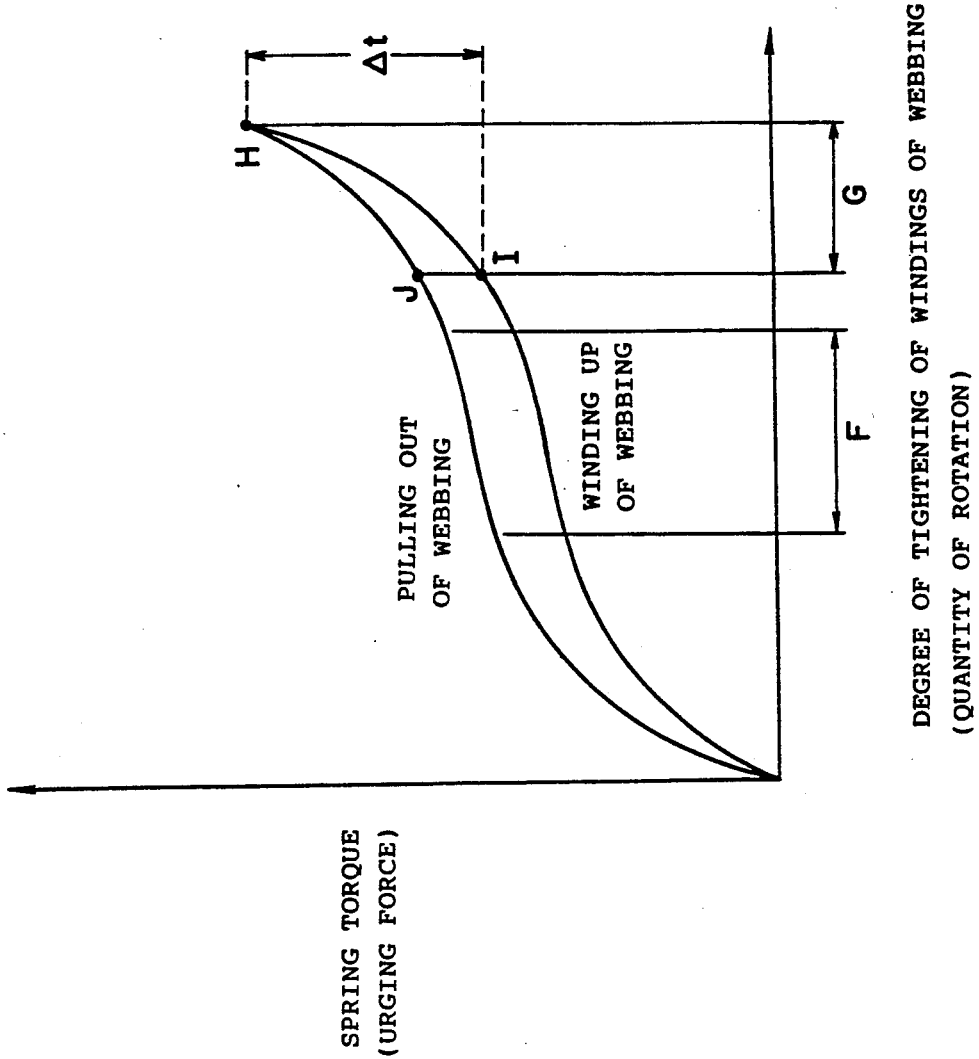

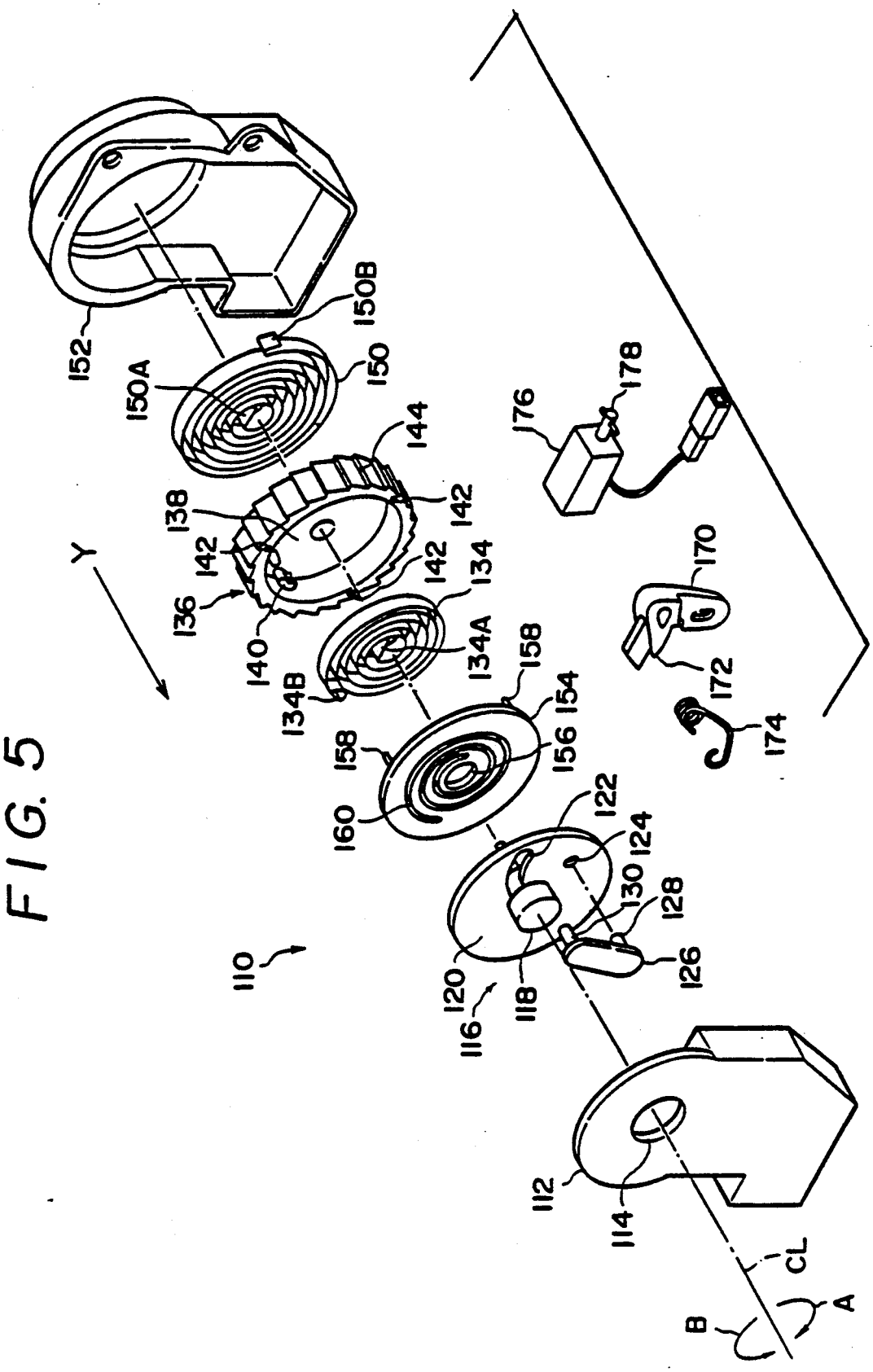

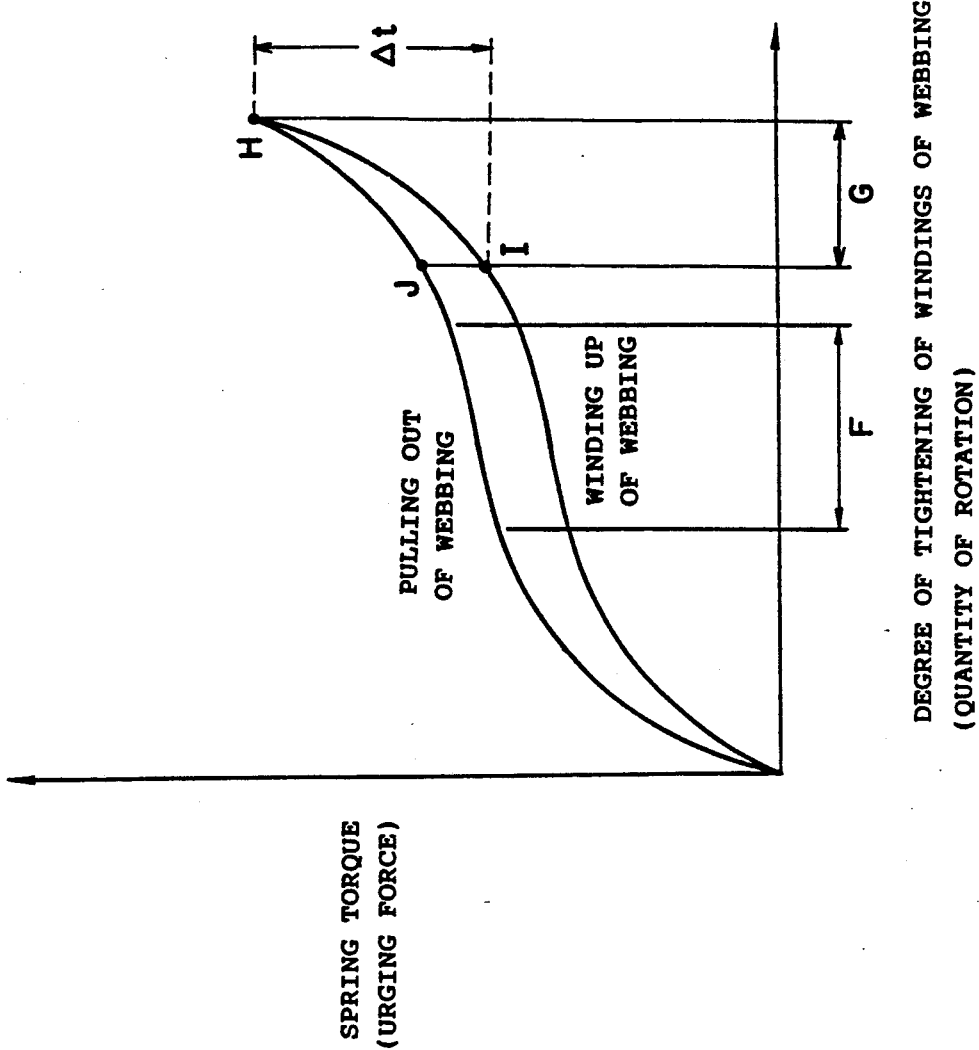

TENSION REDUCER

BACKGROUND OF THE INVENTION

1) Field of the Invention

The present invention relates to a tension reducer, and particularly to a tension reducer suitable for use in a webbing retractor.

2) Description of the Related Art

This type of tension reducer (webbing retractor) has two types of spiral springs: one having a strong resilient characteristic and the other having a weak resilient characteristic (large and small). One end of the weak resilient spiral spring is connected to a webbing take-up spindle, whereas the other end thereof is connected to the strong resilient spiral spring by way of a gear wheel. The other end of the strong resilient spiral spring is fastened to a case (cover). That is, the take-up spindle, the weak resilient spiral spring, the gear wheel and the strong resilient spiral spring are connected in series to one another. The take-up spindle is urged in a webbing winding direction by these spiral springs. In addition, a pawl lever is provided in the vicinity of the gear wheel and can be brought into engagement with the gear wheel to block its rotation. The operation of the pawl lever is interlocked with the activation of a solenoid or the opening/closing of vehicle doors. Further, the weak resilient spiral spring is always kept in a fully close-wound state before the webbing is fastened to an occupant.

The strong resilient spiral spring is wound tight in accordance with the rotation of the take-up spindle while the occupant is pulling out the webbing therefrom to put it on. The weak resilient spiral spring connected in series to the strong resilient spiral spring is kept in the fully close-wound state over a period in which the strong resilient spiral spring is being wound tight. The pawl lever is activated by an operating mechanism immediately after the occupant puts on the webbing so as to cause the gear wheel to stop rotating. That is, the tension reducer is in an activated state. Thus, the urging force of the wound-tight, strong resilient spiral spring in the webbing winding direction is not exerted on the take-up spindle, and hence the webbing is pulled out only by the weak resilient spiral spring. As a consequence, the occupant feels unrestricted by the pressure of the webbing.

In general, the torque characteristics of the weak resilient spiral spring are graphically represented by hysteretic and non-linear curves as shown in FIGS. 4 and 8. When the occupant attempts to put on the webbing, the weak resilient spiral spring is in a fully close-wound state before the webbing is pulled out of the take-up spindle. Therefore, the torque of the weak resilient spiral spring represents the maximum value at the point H shown in each of FIG. 4 and 8. Since the weak resilient spiral spring is kept in the fully close-wound state even while the webbing is being pulled out by the occupant, the torque of the weak resilient spiral spring represents the value at the point H. The state referred to above continues until the tension reducer starts to operate. When the webbing is fastened to the occupant, the tension reducer is activated. As a consequence, the urging force of the strong resilient spiral spring is not exerted on the take-up spindle and only the urging force of the weak resilient spiral spring is exerted on the take-up spindle. However, the webbing is allowed to extend to an increased length at this time in order for the occupant to operate a buckle device. Therefore, the weak resilient spiral spring still remains in the fully close-wound state. Thus, even at this time, the weak resilient spiral spring represents the value at the point H. After the buckle device has been operated by the occupant, the webbing is slightly wound up by the urging force of the weak resilient spiral spring in such a manner that the webbing is exactly fitted to an occupant's body. Therefore, the weak resilient spiral spring falls into a slightly-loosened state. Thus, the torque of the weak resilient spiral spring at this time is represented as a slightly-lowered value, i.e., a value at the point I shown in each of FIGS. 4 and 8.

On the other hand, when the occupant desires to release the fastened webbing, the blocking of the gear wheel by the pawl lever is released so that it may rotate. Namely, the tension reducer is put into a released state. Therefore, the urging force produced by the strong resilient spiral spring in the webbing winding direction is exerted on the take-up spindle again, so that the webbing is rapidly wound up thereon by the strong resilient spiral spring. Since the weak resilient spiral spring connected in series to the strong resilient spiral spring has an urging force smaller than that of the strong resilient spiral spring, it is wound tight by the urging force of the strong resilient spiral spring. When the webbing is fully wound up on the take-up spindle, the rotation of the take-up spindle is stopped. However, in this case, the weak resilient spiral spring has been kept in the fully close-wound state.

The torque of the weak resilient spiral spring at the time that the tension reducer is deactivated and the weak resilient spiral spring is wound tight by the urging force of the strong resilient spiral spring is represented by a value at a point J shown in each of FIGS. 4 and 8. The change in torque developed when the weak resilient spiral spring is wound tight by the urging force of the strong resilient spiral spring is represented by a curve indicative of a transition from the point J to the point H. The torque of the weak fully wound up on the take-up spindle is represented by the maximum value at the point H because the weak resilient spiral spring is in the fully close-wound state.

Thus, the region indicative of the degree of tightening of the windings of the weak resilient spiral spring in the conventional tension reducer corresponds to the range represented by G in each of FIGS. 4 and 8. Therefore, the range of the torque to be used is from the value at the point H to the value at the point I in the same drawing. When the torque region to be used is compared with an entire torque curve, it is found that the weak resilient spiral spring is used in the range in which the spring torque is considerably high. In addition, the difference in the spring torque between the points I and H is represented by ΔT, and the weak resilient spiral spring is employed in a region where the change in torque is great.

However, when the urging force of the weak resilient spiral spring becomes large after the occupant puts on the webbing and the tension reducer is activated, the webbing is pulled out excessively, so that the feeling of applied pressure to whoever wears the webbing is recognized.

When it is desired to adjust the length of the webbing according to movements of the body or the like after the occupant has put on the webbing and the tension reducer is activated, the pulling out of the webbing against the urging force of the weak resilient spiral spring or the winding up of the webbing by the urging force of the weak resilient spiral spring is performed. When the urging force of the weak resilient spiral spring is not constant at this time, there is a situation in which the pulling out or winding up of the webbing cannot be accomplished as the occupant intends.

SUMMARY OF THE INVENTION

With the forgoing in view, it is an object of the present invention to provide a tension reducer which is capable of setting the range of torque of a weak resilient spiral spring to a range of small values over its entirety, while the tension reducer is being activated, and which is capable of setting the torque range to a range in which the change in torque is low in order to avoid the feeling of pressure being applied to an occupant while he is wearing a webbing and to make adjustment of the length of the webbing convenient. In order to achieve the above object, there is further provided a tension reducer which holds the degree of tightening of the windings of the weak resilient spiral spring at the time of the deactivation of the tension reducer in a slightly-loosened state as compared with a fully close-wound state, and also holds the degree of tightening of the windings of the weak resilient spiral spring at the time of the activation of the tension reducer in a loosened state as compared with a conventional state.

According to one aspect of the present invention, there is provided a tension reducer suitable for use in a webbing retractor, which comprises:

a weak resilient spiral spring whose one end is connected to the webbing take-up spindle of the webbing retractor, and which exerts an urging force in a webbing winding direction;

a connecting member connected to the other end of the weak resilient spiral spring and disposed rotatably about the take-u spindle;

a strong resilient spiral spring whose one end is connected to the connecting member and which exerts an urging force in the webbing winding direction greater than the urging force of the weak resilient spiral spring;

a device for stopping the rotation of the connecting member in the webbing winding direction so as to avoid the exertion of the urging force of the strong resilient spiral spring on a webbing at the time that the webbing is pulled out of the take-up spindle to be applied to an occupant; and a device disposed about the take-up spindle for controlling the degree of tightening of the windings of the weak resilient spiral spring so as to avoid exceeding a predetermined range.

When the occupant pulls the webbing out of the take-up spindle to wear the same, a limiting member limits the degree of tightening of the windings of the weak resilient spiral spring so as to avoid going beyond a predetermined region even when the take-up spindle is rotated. Thus, only the strong resilient spiral spring is wound tight. That is, the weak resilient spiral spring is kept in a state before the fully close-wound state, and hence the urging force thereof at that state is also set to a small predetermined value as compared with the fully close-wound state.

After the webbing is fastened to the occupant, the rotation of the connecting member in the webbing winding direction is stopped (the tension reducer falls into an activated state). Therefore, the urging force of the wound-tight strong resilient spiral spring in the webbing winding direction is not exerted on the take-up spindle, so that the webbing is pulled out only by the weak resilient spiral spring.

The weak resilient spiral spring is kept in the state before the fully close-wound state at the time of the activation of the tension reducer. Therefore, the webbing is no longer pulled out excessively upon exertion of the urging force of the weak resilient spiral spring on the take-up spindle. Thus, the feeling of applied pressure to whoever wears the webbing is avoided, thereby giving to the occupant a state in which he can comfortably wear the webbing.

When it is desired to deactivate the tension reducer by opening and closing an automobile door, for example, in the state in which the webbing is applied to the occupant, the rotation of the connecting member in the webbing winding direction is made possible again. Therefore, the urging force of the strong resilient spiral spring in the webbing winding direction is exerted on the webbing take-up spindle again by way of the connecting member and the weak resilient spiral spring. When the tension reducer is deactivated and the rotation of the connecting member in the webbing winding direction is made possible again, a large urging force (force for rotating the webbing take-up spindle) of the strong resilient spiral spring is temporarily transmitted to the weak resilient spiral spring by way of the connecting member. Even in this case, the limiting member limits the degree of tightening of the windings of the weak resilient spiral spring so as to avoid going beyond a predetermined region in accordance with the rotation of the connecting member. Therefore, the weak resilient spiral spring is not kept in the fully close-wound state. Thus, even when the tension reducer is activated again after that, the urging force of the weak resilient spiral spring is not exerted on the take-up spindle excessively. As a consequence, the webbing is not pulled out of the take-up spindle beyond demand, thus avoiding the feeling of applied pressure to whoever wears the webbing and again providing a state in which the occupant can comfortably wear the webbing.

On the other hand, when the occupant voluntarily unfastens the webbing and the tension reducer is deactivated in response to this operation, the rotation of the connecting member in the webbing winding direction is made possible again. Thus, the urging force of the strong resilient spiral spring in the webbing winding direction is exerted on the webbing take-up spindle again by way of the connecting member and the weak resilient spiral spring, so that the webbing is immediately wound on the webbing take-up spindle by the strong resilient spiral spring.

When the tension reducer is deactivated and the rotation of the connecting member in the webbing winding direction is made possible again, the large urging force (force for rotating the webbing take-up spindle) of the strong resilient spiral spring is temporarily transmitted to the weak resilient spiral spring by way of the connecting member. Even in this case, the limiting member limits the degree of tightening of the windings of the weak resilient spiral spring so as to avoid going beyond the predetermined region according to the rotation of the take-up spindle. Therefore, the weak resilient spiral spring is not brought into the fully close-wound state.

Thus, when the webbing is next fastened to the occupant again, the weak resilient spiral spring is kept in a limited state such that the degree of tightening of the windings thereof is not beyond the predetermined region.

As described above, the tightening of the windings of the weak resilient spiral spring is restrained by the limiting member, and the weak resilient spiral spring does not fall into the fully close-wound state in spite of either the activation or deactivation of the tension reducer. Therefore, when the urging force of the weak resilient spiral spring is exerted on the webbing take-up spindle, the webbing is not pulled out excessively, thus avoiding the feeling of the applied pressure to whoever wears the webbing. Since the weak resilient spiral spring is not kept in the fully close-wound state, a weak resilient spiral spring having non-linear spring characteristics can be used in the range where the torque (urging force) thereof does not vary. Thus, the urging force of the weak resilient spiral spring, which is exerted on the webbing take-up spindle, can be rendered constant after the webbing is fastened to the occupant, irrespective of the degree of winding up of the webbing or the extended webbing length, thus making convenient use of the winding-up and pulling-out of the webbing.

As mentioned above, the tension reducer according to the present invention can bring about an advantageous effect in that it can be realized without pulling out the webbing excessively so as to give the feeling of applied pressure to whoever wears the webbing upon activation of the tension reducer, and without excluding convenient use of winding-up and pulling-out of the webbing or the like, while the winding-up force of the webbing is kept constant regardless of the degree of winding up of the webbing or the extended webbing length after the webbing is applied to the occupant.

The above and other objects, features and advantages of the present invention will become apparent from the following description and the appended claims, taken in conjunction with the accompanying drawings in which preferred embodiment of the present invention are shown by way of illustrative example.

BRIEF DESCRIPTION OF THE DRAWINGS

FIGS. 3A through 3C are schematic front views showing the degree of tightening of the windings of strong resilient spiral springs, weak resilient spiral springs and webbings, respectively;

FIG. 4 is a diagram for describing the characteristics of the weak resilient spiral spring;

FIG. 5 is an exploded perspective view of a tension reducer according to a second embodiment of the present invention;

FIG. 8 is a diagram for describing the characteristics of the weak resilient spiral springs.

DETAILED DESCRIPTION OF THE PREFERRED EMBODIMENTS

Figure 1:
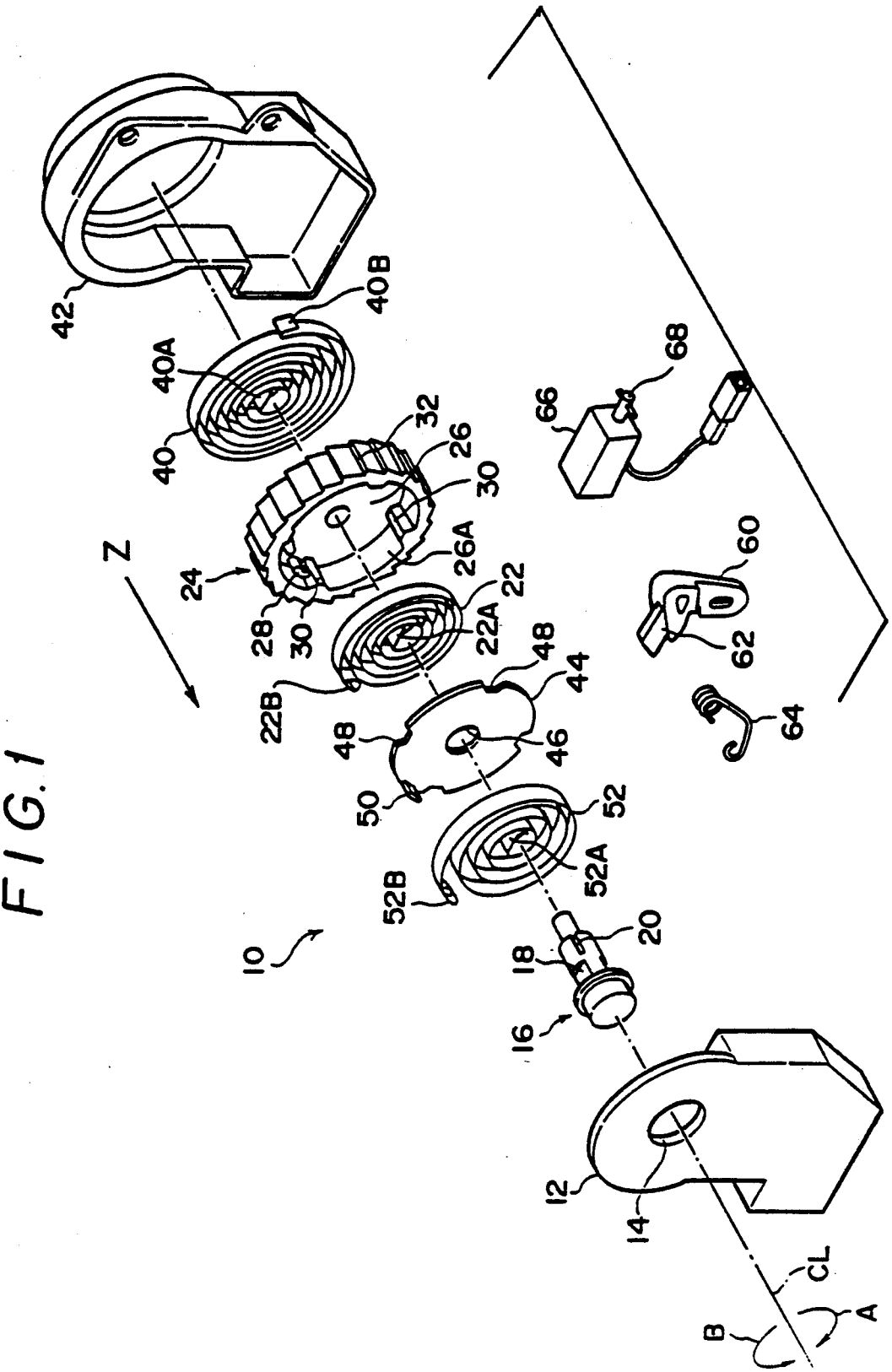
FIG. 1 is an exploded perspective view of a tension reducer according to a first embodiment of the present invention.
Figure 2:
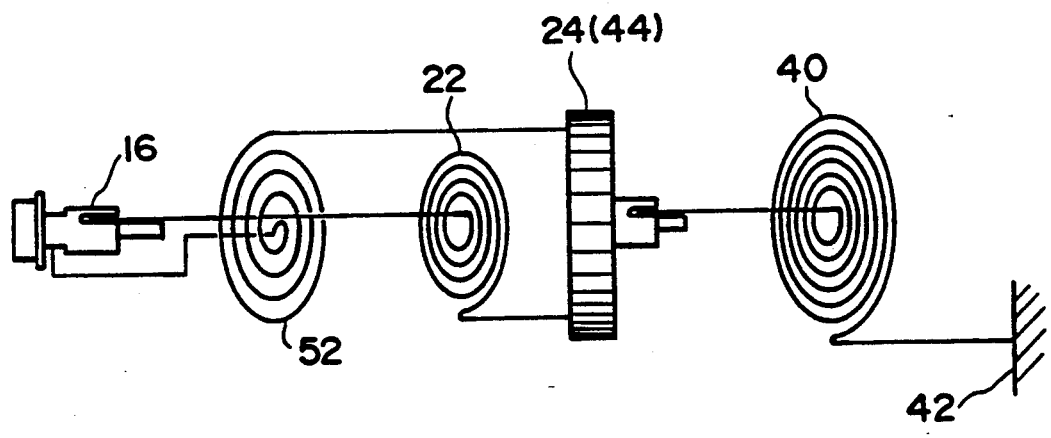
FIG. 2 is a schematic diagram showing a modeled tension reducer according to the first embodiment of the present invention, the tension reducer including springs as seen in the direction indicated by the arrow Z in FIG. 1.

A description will hereinafter be made of preferred embodiments of the present invention with reference to the accompanying drawings. FIG. 1 is an exploded perspective view of a tension reducer according to a first embodiment of the present invention. FIG. 2 schematically shows a structure in which the tension reducer 10 of FIG. 1 is modeled.

In the tension reducer 10, a spring sheet 12 is mounted on a frame (not shown) of a webbing retractor to which the tension reducer 10 is applied. The spring sheet 12 has an insertion hole 14 defined therein coaxially with a webbing take-up spindle (longitudinal axis CL). In addition, an adapter 16 is supported by the spring sheet 12.

The adapter 16 is shaped substantially in the form of a cylinder and inserted into the insertion hole 14 of the spring sheet 12 so as to be rotatably supported thereby. In addition, the adapter 16 is connected to the webbing take-up spindle. Thus, the adapter 16 is always rotated together with the webbing take-up spindle.

The adapter 16 has a concave portion 18 which is defined in an axial central portion and serves as a portion for fixing a tape 52 to be described later. A cut-away portion 20 is axially defined in the outer periphery of an end portion of the adapter 16, which is opposite to the spring sheet 12. Further, an inner end portion 22A of a weak resilient spiral spring 22 is maintained in engagement with the cut-away portion 20. On the other hand, an outer end 22B of the weak resilient spiral spring 22 is maintained in engagement with a gear wheel 24 as a connecting member.

The gear wheel 24 is shaped in the form of a disc. A concave receiving portion 26 having a size corresponding to the weak resilient spiral spring 22 is defined in association with a side wall of the spring sheet 12. The concave receiving portion 26 has an interlocking projection 28 formed so as to project in the vicinity of an outer peripheral wall 26A. In addition, the weak resilient spiral spring 22 is accommodated in the concave receiving portion 26, and the outer end 22B of the spiral spring 22 is maintained in engagement with the interlocking projection 28. Fitting projections 30 extending in the radial direction of the concave receiving portion 26 are formed in the direction of the periphery thereof at equal intervals on the outer wall 26A of the concave receiving portion 26.

A plurality of ratchet teeth 32 are formed over the outer periphery of the gear wheel 24. Further, a shaft portion (not shown) is formed on a face opposite to the concave receiving portion 26 of the gear wheel 24 along the longitudinal axis CL. In addition, the shaft portion is maintained in engagement with an inner end 40A of a strong resilient spiral spring 40, and an outer end 40B of the strong resilient spiral spring 40 is maintained in engagement with a cover 42.

More specifically, as also shown in FIG. 2, the adapter 16, the weak resilient spiral spring 22, the gear wheel 24 and the strong resilient spiral spring 40 are connected in series to one another. The adapter 16 and the webbing take-up spindle connected thereto are urged in a webbing winding direction (direction indicated by the arrow B in FIG. 1) by the two spiral springs.

A plate 44 is attached to the concave receiving portion 26 of the gear wheel 24, in which the weak resilient spiral spring 22 is received. The plate 44 is shaped in the form of a disc and has a hole 46 for the insertion of the adapter 16 therein, which is defined in the center of the plate 44. In addition, notches 48 are formed in outer peripheral ends of the plate 44 in association with the fitting projections 30 of the gear wheel 24. The plate 44 is fixed to the gear wheel 24 and the weak resilient spiral spring 22 is received and held in the concave receiving portion 26 by fitting the notches 48 in their associated fitting projections 30. Thus, the plate 44 is always rotated together with the gear wheel 24.

An interlocking projection 50 is formed so as to project from a face of the plate 44 on the side opposite to the gear wheel 24. An outer end 52b of a tape 52 as a spiral member is maintained in engagement with the interlocking projection 50.

The tape 52 is made of a thin-walled resin and spirally constructed in the same orientation as that of the weak resilient spiral spring 22. An inner end 52A on the side of the center of the spiral of the spirally-constructed tape 52 is fixed to the concave portion 18 of the adapter 16. More specifically, the tape 52 is connected to the adapter 16 and the gear wheel 24 in parallel with the weak resilient spiral spring 22 as shown in FIG. 2. Thus, the tape 52 is wound tight and released in the same directions as the weak resilient spiral spring 22 while following the rotation of either the adapter 16 or the gear wheel 24. Incidentally, in this case, the overall length of the tape 52, the number of times the tape 52 is spirally wound, and the thickness of the spirally-wound tape 52 are set in such a manner that the tape 52 is in a fully close-wound state (in a state in which adjoining spirals on the inner and outer surfaces of the tape 52 are closed) before the weak resilient spiral spring 22 is wound tight to a fully close-wound state (in other words, the state in which the urging force of the weak resilient spiral spring 22 corresponding to the degree of tightening of the windings of the tape 52 does not vary).

A pawl lever 60, which constitutes a rotation stopping means for the gear wheel 24, is swingably arranged below the gear wheel 24. A hook portion 62 is formed in the pawl lever 60 and is engageable with the ratchet teeth 32 of the gear wheel 24. When the hook portion 62 is brought into engagement with one of the ratchet teeth 32, the rotation of the gear wheel 24 in the webbing winding direction (direction indicated by the arrow B in FIG. 1) is stopped.

A return spring 64 is disposed adjacent to the pawl lever 60 and serves to urge the hook portion 62 of the pawl lever 60 in the direction away from the ratchet teeth 32 at all times. In addition, a solenoid 66 is provided adjacent to the pawl lever 60. An actuator unit 68 of the solenoid 66 is connected to the pawl lever 60. When in operation, the actuator unit 68 serves to swingably rotate the pawl lever 60 against the urging force of the return spring 64, thereby making it possible to bring the hook portion 62 into engagement with the ratchet wheel 32. Incidentally, the solenoid 66 is activated at the time that the webbing is fastened to an occupant.

A description will now be made of the operation of the present embodiment.

In the above-described tension reducer 10, the weak resilient spiral spring 22 is wound tight a predetermined amount as shown in FIG. 3A before the webbing is applied to the occupant, i.e., in the state in which the webbing is fully taken up. In addition, the strong resilient spiral spring 40 is kept in a state in which the diameter thereof is at its largest, and the tape 52 is kept in the closest wound state.

Thus, the webbing can freely be released by rotating the adapter 16 (a webbing take-up spindle) against the urging force of the strong resilient spiral spring 40 under the conditions referred to above. Since the weak resilient spiral spring 22 is kept in a state before the fully close-wound state under the conditions mentioned above, the urging force of the weak resilient spiral spring 22 is set to a predetermined value smaller than the value of the weak resilient spiral spring 22 in the fully close-wound state.

When the pulled-out webbing is fastened to the occupant, the solenoid 66 is activated. When the solenoid 66 is activated, the pawl lever 60 is swingably rotated by the movement of the actuator unit 68 so that the hook portion 62 is brought into engagement with one of the ratchet teeth 32 of the gear wheel 24, thereby preventing the gear wheel 24 from being rotated in the webbing winding direction. Thus, the strong resilient spiral spring 40 is maintained as is in the maximum wound-tight state. In addition, the urging force of the strong resilient spiral spring 40 in the webbing winding direction is no longer exerted on the adapter 16 and the webbing take-up spindle connected thereto, whereby the webbing is pulled out only against the force of the weak resilient spiral spring 22.

Since the weak resilient spiral spring 22 is held in the state before the fully close-wound state at the time of the activation of the tension reducer, the webbing is no longer pulled out excessively upon exertion of the urging force of the weak resilient spiral spring 22 on the adapter 16 (webbing take-up spindle), thus avoiding the feeling of applied pressure on whoever wears the webbing and hence providing a state in which the occupant can comfortably wear the webbing.

When the tension reducer is in operation, it is simply necessary to pull the webbing out of the webbing take-up spindle against the urging force of the weak resilient spiral spring 22. That is, a transition for releasing the webbing from the webbing take-up spindle is made between the state shown in FIG. 3B and the state depicted in FIG. 3C. Thus, the webbing take-up spindle connected to the adapter 16 can also be rotated freely, and the pulling-out of the webbing therefrom and its controllability are not subjected to inhibition.

When it is desired to deactivate the tension reducer by opening and closing an automobile door or the like, for example, in the state in which the webbing is fastened to the occupant, the solenoid 66 is deactivated. When the solenoid 66 is deactivated, the pawl lever 60 is swingably turned by the urging force of the return spring 64 so that the hook portion 62 is unlocked from its associated ratchet tooth 32, thereby releasing the inhibition of the gear wheel 24 from being rotated. As a consequence, the rotation of the gear wheel 24 in the webbing winding direction can be performed again. Therefore, the urging force of the strong resilient spiral spring 40 in the webbing winding direction is exerted on the adapter 16 (webbing take-up spindle) again by way of the gear wheel 24 and the weak resilient spiral spring 22. When the tension reducer is deactivated and the rotation of the gear wheel 24 in the webbing winding direction is made possible again, a large urging force (force for rotating the webbing take-up spindle) of the strong resilient spiral spring 40 is temporarily transmitted to the weak resilient spiral spring 22 by way of the gear wheel 24. Even in this case, the tightening of the windings of the weak resilient spiral spring 22 is stopped at the time that the tape 52 reaches the fully close-wound state in accordance with the rotation of the gear wheel 24. Therefore, the weak resilient spiral spring 22 is not kept in the fully close-wound state. Thus, even when the tension reducer is activated again after that, the urging force of the weak resilient spiral spring 22 is not exerted on the adapter 16, i.e., the webbing take-up spindle beyond demand. As a consequence, the webbing is not pulled out beyond demand, thus avoiding the feeling of the applied pressure to whoever wears the webbing and providing a state in which the occupant can comfortably wear the webbing.

On the other hand, when the occupant voluntarily unfastens the webbing and the solenoid 66 is deactivated in response to its operation, the hook portion 62 of the pawl lever 60 is separated from its associated ratchet tooth 32 so as to release the inhibition of the gear wheel 24 from being rotated in the same manner as described above. Thus, the urging force of the strong resilient spiral spring 40 in the webbing winding direction is exerted on the webbing take-up spindle by way of the gear wheel 24, the weak resilient spiral spring 22 and the adapter 16, so that the webbing is rapidly wound on the webbing take-up spindle by the large urging force of the strong resilient spiral spring 40. In addition, the strong resilient spiral spring 40 is reset to the state in which the diameter thereof is at the maximum.

Upon release of the inhibition of the gear wheel 24 from being rotated, i.e., deactivation of the tension reducer, the large urging force of the strong resilient spiral spring 40 is temporarily transmitted to the weak resilient spiral spring 22 through the gear wheel 24. Therefore, the weak resilient spiral spring 22 is temporarily wound tight, and thereafter the large urging force of the strong resilient spiral spring 40 is exerted on the webbing take-up spindle. Even in this case, the tape 52 connected to the gear wheel 24 via the plate 44 is wound tight in accordance with the rotation of the gear wheel 24, and the tightening of the windings of the weak resilient spiral spring 22 is caused to cease at the time that the tape 52 is in the fully close-wound state. Thus, the weak resilient spiral spring 22 is no longer kept in the fully close-wound state.

As described above, the tightening of the windings of the weak resilient spiral spring 22 is restrained by the tape 52 in the tension reducer 10. Thus, the weak resilient spiral spring 22 does not be come in the fully close-wound state irrespective of either the activation or deactivation of the tension reducer. Therefore, when the urging force of the weak resilient spiral spring 22 is exerted on the webbing take-up spindle by way of the adapter 16, the webbing is not pulled out excessively, thus avoiding the feeling of the applied pressure to whoever wears the webbing. Since the weak resilient spiral spring 22 does not become in the fully close-wound state, the weak resilient spiral spring 22 having nonlinear spring characteristics can be used in the range in which the torque (urging force) thereof does not vary. Thus, the urging force of the weak resilient spiral spring 22, which is exerted on the adapter 16, i.e., the webbing take-up spindle, can be rendered constant in spite of the degree of tightening of the windings of the webbing and the extended webbing length, thus making convenient use of the winding-up and pulling-out of the webbing or the like and causing no deterioration in its controllability.

Figure 6:
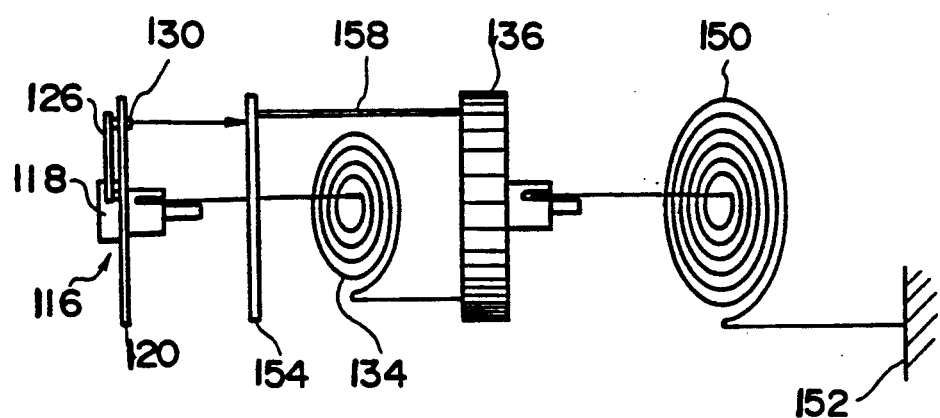
FIG. 6 is a schematic diagram depicting a modeled tension reducer according to the second embodiment of the present invention, the tension reducer including springs as seen in the direction indicated by the arrow Y in FIG. 5.

FIG. 5 is an exploded perspective view of a tension reducer 110 according to a second embodiment of the present invention. In addition, FIG. 6 schematically shows a structure in which the tension reducer 110 is modeled.

In the tension reducer 110, a spring sheet 112 is mounted on a frame (not shown) of a webbing take-up spindle to which the tension reducer 110 is applied. The spring sheet 112 has an insertion hole 114 defined coaxially with the webbing take-up spindle (longitudinal axis CL), and supports an adapter 16.

The adapter 116 comprises a shaft portion 118 and an adapter portion 120 shaped in the form of a disc integrally with an axially-extending intermediate portion of the shaft portion 118. The shaft portion 118 is inserted into the insertion hole 114 of the spring sheet 112 so as to be rotatably supported thereby, and then connected to the webbing take-up spindle. Therefore, the adapter 116 is always rotated together with the webbing take-up spindle about the shaft portion 118.

The adapter portion 120 has a slot 122 defined in the form of a circular arc along the radial direction; thereof, and has a bearing hole 124 defined adjacent to the slot 122. In addition, a lever 126 as a lever member is fitted in the bearing hole 24. A support shaft 128 extends along the axis of the webbing take-up spindle from one end of the lever 126 in the direction of the length thereof. Further, the support shaft 128 is fitted in the bearing hole 124 of the adapter portion 120 from the side of the spring sheet 112 so as to be rotatably supported. On the other hand, an engagement projection 130 extends along the axis of the webbing take-up spindle from the other end of the lever 126 in the direction of length thereof in the same manner as the shaft 128. The engagement projection 130 is movably inserted into the slot 122 of the adapter portion 120, and the tip portion of the engagement projection 130 extends from the adapter portion 120 (the slot 122) toward the opposite side of the spring sheet 112. That is, the lever 126 can be rotated about the shaft 128 (the bearing hole 124) within the range in which the engagement projection 130 can be moved along the slot 122 of the adapter portion 120.

An inner end 134A of a weak resilient spiral spring 134 is maintained in engagement with a portion of the shaft portion 118 located on the opposite side of the lever 126 (spring sheet 112). In addition, an outer end 134B of the weak resilient spiral spring 134 is maintained in engagement with a gear wheel 136 as a connecting member.

The gear wheel 136 is shaped in the form of a disc. A concave receiving portion 138 having a size corresponding to the weak resilient spiral spring 134 is defined in association with a side wall of the spring sheet 112. The concave receiving portion 138 has an interlocking projection 140 formed so as to project in the vicinity of an outer peripheral wall thereof. In addition, the weak resilient spiral spring 134 is accommodated in the concave receiving portion 138 and the outer end 134B of the spiral spring 134 is maintained in engagement with the interlocking projection 140. Then, a plurality of recesses 142 are defined in the side (a portion adjacent to the outer periphery of the gear wheel 136) of the concave receiving portion 138.

A plurality of ratchet teeth 144 are formed over the outer periphery of the gear wheel 136. Further, a shaft portion (not shown) is formed on a face opposite to the concave receiving portion 138 of the gear wheel 136 along the longitudinal axis CL. In addition, the shaft portion is maintained in engagement with an inner end 150A of a strong resilient spiral spring 150, and an outer end 150B of the strong resilient spiral spring 150 is maintained in engagement with a cover 152.

More specifically, the adapter 116, the weak resilient spiral spring 134, the gear wheel 136 and the strong resilient spiral- spring 150 are connected in series to one another as also shown in FIG. 6. The adapter 116 and the webbing take-up spindle connected thereto are urged in a webbing winding direction (direction indicated by the arrow B in FIG. 5) by the two spiral springs 134, 150.

A plate 154 as a limiting plate is attached to the concave receiving portion 138 of the gear wheel 136, in which the weak resilient spiral spring 134 is received. The plate 154 is shaped in the form of a disc and has a hole 156 for the insertion of the shaft portion 118 of the adapter 116 therein, which is defined in the center of the plate 154. The hole 156 is not joined with the shaft portion 118, which is not used to directly rotate the plate 154. In addition, pins 158 are formed in the outer peripheral ends of the plate 154 on the side of the gear wheel 136 in association with the recesses 142 of the gear wheel 136. The plate 154 is fixed to the gear wheel 136 and the weak resilient spiral spring 134 is accommodated and held in the concave receiving portion 138 by fitting the pins 48 in their associated recesses 142. Thus, the plate 154 is always rotated together with the gear wheel 136.

A guide groove 160 is defined on a face of the plate 154 on the side opposite to the gear wheel 136. The guide groove 160 is spirally defined in the same orientation-as that of the weak resilient spiral spring 134. The tip portion of the engagement projection 130 of the lever 126, which extends through the slot 122 defined in the adapter 116, is movably fitted in the guide groove 160. Thus, when the adapter 116 and the plate 154 are rotated relative to each other, the engagement projection 130 is guided into the guide groove 160 so as to rotate the lever 126 about the support shaft 128. In this case, the engagement projection 130 is movably entered into the slot of the adapter 116. Therefore, no restraint is imposed on the rotational movement of the lever 126 about the support shaft 28 when the engagement projection 130 is guided into the guide groove 160 and moved therealong. When the relative rotation between the adapter 116 and the plate 154 proceeds and the engagement projection 130 of the lever 126 is moved along the guide groove 160 while being guided therein so that it reaches a terminating portion of the coiled guide groove 160, limitation is imposed on the rotational movement of the engagement projection 130. As a consequence, the relative rotation between the adapter 116 and the plate 154 is stopped.

More specifically, the lever 126 attached to the adapter 116 and the plate 154 having the guide groove 160 brought into engagement with the lever 126 are connected to the adapter 116 and the gear wheel 136 in parallel with the weak resilient spiral spring 134 as also shown in FIG. 6.

Thus, the weak resilient spiral spring 134 is also wound tight and released in the same direction while following the relative rotation between the adapter 116 and the gear wheel 154. Incidentally in this case, the overall length of the guide groove 160 and the number of times in which the guide groove 160 is spirally wound are set in such a manner that the relative rotation between the adapter 116 and the plate 154 stops before the weak resilient spiral spring 134 is wound tight so as to be a fully close-wound state (in other words, in a state in which an urging force of the weak resilient spiral spring 134 corresponding to the degree of tightening of the windings thereof does not vary).

A pawl lever 170, which constitutes a rotation stopping means for the gear wheel 136, is swingably disposed below the gear wheel 136. A hook portion 172 is formed in the pawl lever 170 and engageable with the one of the ratchet teeth 144 of the gear wheel 136. When the hook portion 172 is brought into engagement with one of the ratchet teeth 144, the rotation of the gear wheel 136 in the webbing winding direction (direction indicated by the arrow B in FIG. 5) is stopped.

A return spring 174 is disposed adjacent to the pawl lever 170 and serves to urge the hook portion 172 of the pawl lever 170 in the direction away from the ratchet teeth 144 at all times. In addition, a solenoid 176 is provided adjacent to the pawl lever 170. An actuator unit 178 of the solenoid 176 is connected to the pawl lever 170. When in its operation, the actuator unit 178 serves to swingably rotate the pawl lever 170 against an urging force of the return spring 174, thereby making it possible to bring the hook portion 172 into engagement with the ratchet wheel 144. Incidentally, the solenoid 176 is activated at the time that an occupant puts on the webbing.

A description will now be made of the operation of the present embodiment.

Figure 7A:
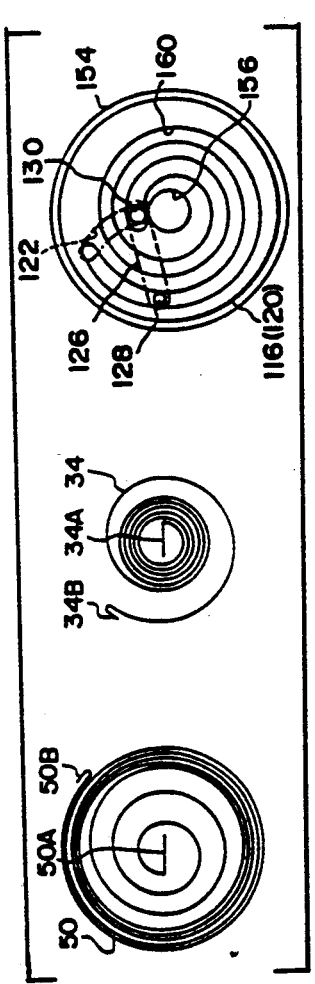
FIGS. 7A through 7C are schematic front views showing the degree of tightening of the windings of strong resilient spiral springs and weak resilient spiral springs and depicting the relationship between levers and guide holes, respectively.

In the tension reducer 110 constructed as described above, the weak resilient spiral spring 134 is wound tight to the maximum as shown in FIG. 7A before the webbing is applied to the occupant, i.e., in the state in which the webbing is fully taken up. In addition, the strong resilient spiral spring 150 is kept in a state in which the diameter thereof is at its largest. The lever 126 attached to the adapter 116 is positioned at a radially-formed inner end of the slot 122, and disposed in an inner end of the coiled guide groove 160 of the plate 154.

Thus, the webbing can freely be released by rotating the adapter 116 (a webbing take-up spindle) against the urging force of the strong resilient spiral spring 150 under the state referred to above.

In this case, the engagement projection 130 of the lever 126 reaches the inner end of the coiled guide groove 160 of the plate 154. In addition, the adapter 116 with the lever 126 attached thereto and the plate 154 stop rotating relative to each other. Therefore, even when the adapter 116 is rotated by pulling out the webbing, the weak resilient spiral spring 134 is not wound tight. Thus, the weak resilient spiral spring 134 is kept in a state before the fully close-wound state under the conditions mentioned above. As a consequence, the urging force of the weak resilient spiral spring 134 is set to a predetermined value smaller than that of the weak resilient spiral spring 134 in the fully close-wound state.

When a pulled-out webbing is fastened to the occupant, the solenoid 176 is activated. When the solenoid 176 is activated, the pawl lever 170 is swingably rotated by a movement of the actuator unit 178 so that the hook portion 172 is brought into engagement with one of the ratchet teeth 144 of the gear wheel 136, thereby preventing the gear wheel 136 from being rotated in the webbing winding direction. Thus, the strong resilient spiral spring 150 is kept as is in the maximum wound-tight state. In addition, the urging force of the strong resilient spiral spring 150 in the webbing winding direction is no longer exerted on the adapter 116 and the webbing take-up spindle connected thereto, whereby the webbing is pulled out only by the weak resilient spiral spring 134.

Since the weak resilient spiral spring 13 is held in the state before the fully close-wound state at the time of the activation of the tension reducer, the webbing is no longer pulled out excessively upon exertion of the urging force of the weak resilient spiral spring 134 on the adapter 116 (webbing take-up spindle), thus avoiding the feeling of the applied pressure on whoever wears the webbing and hence providing a state in which the occupant can comfortably wear the webbing.

Figure 7B:
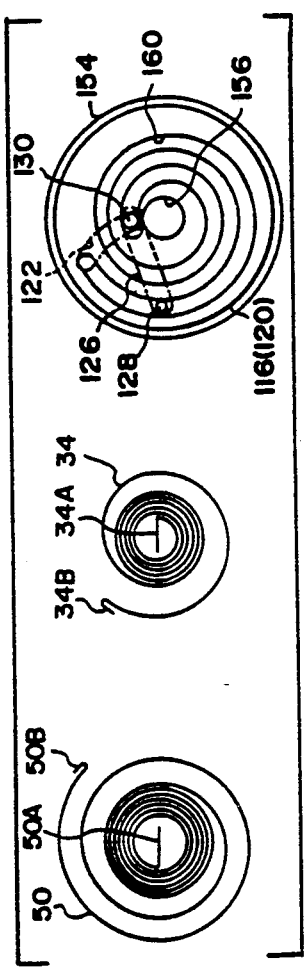
Figure 7C:
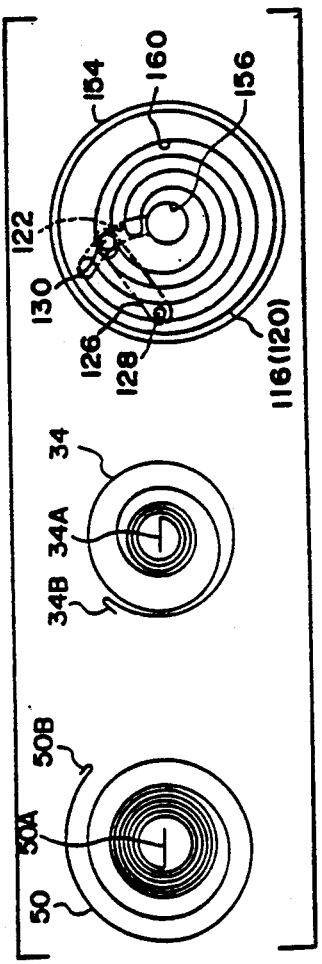

When the tension reducer is in operation, it is simply necessary to pull the webbing out of the webbing take-up spindle against the urging force of the weak resilient spiral spring 134. Namely, a transition for releasing the webbing from the webbing take-up spindle is made between the state shown in FIG. 7B and the state depicted in FIG. 7C. Thus, the webbing take-up spindle connected to the adapter 116 can also be rotated freely, and the pulling-out of the webbing therefrom and its controllability do not deteriorate.

When it is desired to deactivate the tension reducer by opening and closing an automobile door, for example, in the state in which the webbing is applied to the occupant, the solenoid 176 is deactivated. When the solenoid 176 is deactivated, the pawl lever 170-is swingably turned by the urging force of the return spring 174 so that the hook portion 172 is unlocked from its associated ratchet tooth 32, thereby releasing the inhibition of the gear wheel 136 from being rotated. As a consequence, the rotation of the gear wheel 136 in the webbing winding direction can be performed again. Therefore, the urging force of the strong resilient spiral spring 150 in the webbing winding direction is exerted on the adapter 116 (webbing take-up spindle) again by way of the gear wheel 136 and the weak resilient spiral spring 134.

When the tension reducer is deactivated and the rotation of the gear wheel 136 in the webbing winding direction is made possible again, a large urging force (force for rotating the webbing take-up spindle) of the strong resilient spiral spring 150 is temporarily transmitted to the weak resilient spiral spring 134 by way of the gear wheel 136. Even in this case, when the relative rotation between the plate 154 rotated together with the gear wheel 136 and the adapter 116 proceeds and the engagement projection 130 of the lever 126 is brought into contact with the inner end of the coiled guide groove 160, a subsequent rotational movement stops. As a consequence, the adapter 116 to which the lever 126 is attached and the plate 154 stop rotating relative to each other. Therefore, the weak resilient spiral spring 134 wound tight by the rotation of the gear wheel 136 is released from being wound tight, and hence the weak resilient spiral spring 134 is no longer become in the fully close-wound state. Thus, even when the tension reducer is activated again after that, the urging force of the weak resilient spiral spring 134 is not exerted on the adapter 116, i.e., the webbing take-up spindle. As a consequence, the webbing is not pulled out beyond demand, thus avoiding the feeling of applied pressure on whoever wears the webbing, and providing a state in which the occupant can comfortably wear the webbing.

On the other hand, when the occupant voluntarily unfastens the webbing and the solenoid 176 is deactivated in response to its operation, the hook portion 172 of the pawl lever 17 is separated from its associated ratchet tooth 144 so as to release the inhibition of the gear wheel 136 from being rotated in the same manner as described above. Thus, the urging force of the strong resilient spiral spring 150 in the webbing winding direction is exerted on the webbing take-up spindle by way of the gear wheel 136, the weak resilient spiral spring 134 and the adapter 116, so that the webbing is rapidly wound on the webbing take-up spindle by the large urging force of the strong resilient spiral spring 150. In addition, the strong resilient spiral spring 150 is reset to the state in which the diameter thereof is at its maximum.

Upon release of the inhibition of the gear wheel 136 from being rotated, i.e., deactivation of the tension reducer, the large urging force of the strong resilient spiral spring 150 is temporarily transmitted to the weak resilient spiral spring 134 through the gear wheel 136. Therefore, the weak resilient spiral spring 22 starts to wind. Even in this case, the subsequent rotating movement stops at the time that the engagement projection 130 of the lever 126 is brought into contact with the inner end of the coiled guide groove 160 of the plate 154 rotated together with the gear wheel 136. As a consequence, the adapter 116 to which the lever 126 is attached and the plate 154 stop rotating relative to each other. Therefore, the weak resilient spiral spring 134 is prevented from being wound tight, and hence the weak resilient spiral spring 134 is no longer become in the fully close-wound state.

As described above, the tightening of the windings of the weak resilient spiral spring 134 is restrained by bringing the lever 126 attached to the adapter 116 into engagement with the inner end of the coiled guide groove 160 defined in the plate 154 in the tension reducer 110. . Thus, the weak resilient spiral spring 134 is not become in the fully close-wound state irrespective of either the activation or deactivation of the tension reducer 110. Therefore, when the urging force of the weak resilient spiral spring 134 is exerted on the webbing take-up spindle by way of the adapter 116, the webbing is not pulled out beyond demand, thus avoiding the feeling of the applied pressure to whoever wears the webbing. Since the weak resilient spiral spring 134 is not kept in the fully close-wound state, the weak resilient spiral spring 134 having nonlinear spring characteristics can be used in the range in which the torque (urging force) thereof does not vary. Thus, the urging force of the adapter 116, i.e., the weak resilient spiral spring 134, which is exerted on the webbing take-up spindle, can be rendered constant in spite of the degree of winding up of the webbing or the extended webbing length, thus avoiding the problem that the winding-up and pulling-out of the webbing or the like are inconvenient and controllability of the webbing is poor.

Having now fully described the invention, it will be apparent to those skilled in the art that many changes and modifications can be made without departing from the spirit or scope of the invention as set forth herein.

What is claimed is:

1. A tension reducer suitable for use in a webbing retractor, which comprises:
   a weak resilient spiral spring whose one end is connected to a webbing take-up spindle of said webbing retractor and which exerts an urging force in a webbing winding direction;

a connecting member connected to the other end of said weak resilient spiral spring and disposed rotatably about said take-up spindle;

a strong resilient spiral spring whose one end is connected to said connecting member and which exerts a urging force in the webbing winding direction greater than said urging force of said weak resilient spiral spring;

means for stopping the rotation of said connecting member in the webbing winding direction so as to avoid the exertion of said urging force of said strong resilient spiral spring on webbing at the time that said webbing is pulled out of said take-up spindle to be fastened to an occupant; and means for holding torque ranges of said weak resilient spiral spring such that torque is substantially free from variation irrespective of whether or not said stopping means stops the rotation of said connecting member in the webbing winding direction.

2. A tension reducer according to claim 1, wherein said holding means comprises a device for keeping the degree of tightening of the windings of said weak resilient spiral spring within a predetermined range.

3. A tension reducer according to claim 2, wherein said device serves to keep the degree of tightening of the windings of said weak resilient spiral spring at a range in which said weak resilient spiral spring is not in a fully close-wound state.

4. A tension reducer suitable for use in a webbing retractor, which comprises:

a weak resilient spiral spring whose one end is connected to a webbing take-up spindle of said webbing retractor and which exerts an urging force in a webbing winding direction;

a connecting member connected to the other end of said weak resilient spiral spring and disposed rotatably about said take-up spindle;

a strong resilient spiral spring whose one end is connected to said connecting member and which exerts an urging force in the webbing winding direction greater than said urging force of said weak resilient spiral spring;

means for stopping the rotation of said connecting member in the webbing winding direction so as to avoid the exertion of said urging force of said strong resilient spiral spring on a webbing at the time that said webbing is pulled out of said take-up spindle to be fastened to an occupant; and means disposed about said take-up spindle for controlling the degree of tightening of the windings of said weak resilient spiral spring so as to avoid exceeding a predetermined range.

5. A tension reducer according to claim 4, wherein said controlling means is spirally formed in the same orientation as that of said weak resilient spiral spring, and comprises a continuous-shaped member whose one end is connected to said take-up spindle and whose other end is connected to said connecting member, said continuous-shaped member being provided in parallel with said weak resilient spiral spring to control the degree of tightening of the windings of said weak resilient spiral spring in a fully close-wound state.

6. A tension reducer according to claim 5, wherein said continuous-shaped member controls the degree of tightening of the windings of said weak resilient spiral spring in a state that the continuous-shaped member is fully close-wound for preventing said weak resilient spiral spring from falling into the fully close-wound state, by causing said take-up spindle to rotate a predetermined number of times in a webbing releasing direction or causing said connecting member to rotate a predetermined number of times in a webbing winding direction.

7. A tension reducer according to claim 6, wherein said continuous-shaped member has at least one of the structural features of an overall length or has a number of spiral windings, or is set in such a way that said continuous-shaped member comes into the fully close-wound state, so as to prevent said weak resilient spiral spring from coming into the fully close-wound state.

8. A tension reducer according to claim 4, wherein said controlling means comprises a first member connected to said take-up spindle and rotated together with said take-up spindle at all times, and a limiting member connected to said connecting member and rotated together with said connecting member at all times, said limiting member having a coiled guide groove for receiving at least a part of said first member and defined in the same orientation as that of said weak resilient spiral spring, said first member and said limiting member being rotated integrally with each other by causing said first member at least partially received in said coiled guide groove to reach a terminating portion of said coiled guide groove, thereby making it possible to control the degree of tightening of the windings of said weak resilient spiral spring according to the relative rotation between said take-up spindle connected with said first member and said connecting member connected with said limiting member.

9. A tension reducer according to claim 8, wherein said controlling means serves to control the degree of tightening of the windings of said weak resilient spiral spring by causing said first member at least partially received in said coiled guide groove to reach said terminating portion of said coiled guide groove, so as to prevent said, weak resilient spiral spring from tightening into a fully close-wound state, by being caused by either rotation of said take-up spindle in the webbing releasing direction by a predetermined number of times or rotation of said connecting member in the webbing winding direction by a predetermined number of times.

10. A tension reducer according to claim 9, wherein the overall length of said coiled guide groove is set in such a manner that said first member at least partially received in said coiled guide groove reaches said terminating portion of said coiled guide groove.

11. A tension reducer suitable for use in a webbing retractor, which comprises:

a weak resilient spiral spring whose one end is connected to a webbing take-up spindle of said webbing retractor and which exerts an urging force in a webbing winding direction;

a gear wheel connected to the other end of said weak resilient spiral spring, said gear wheel being disposed rotatably about said take-up spindle and having ring-shaped teeth formed on the outer periphery thereof;

a strong resilient spiral spring whose one end is connected to said gear wheel and which exerts an urging force in the webbing winding direction greater than said urging force of said weak resilient spiral spring;

a stopping member having pawls brought into engagement with said teeth to stop the rotation of said gear wheel in the webbing winding direction in order to avoid the exertion of the urging force of said strong resilient spiral spring on said take-up spindle at the time that a webbing is pulled out of said take-up spindle to be fastened to an occupant;

means disposed about said take-up spindle for keeping the degree of tightening of the windings of said weak resilient spiral spring at a region where said weak resilient spiral spring does not come into a fully close-wound state by either one of the rotating force of said take-up spindle in the webbing releasing direction and the urging force of said strong resilient spiral spring in the webbing winding direction.

12. A tension reducer according to claim 11, wherein said keeping means is spirally formed in the same orientation as that of said weak resilient spiral spring, and comprises a continuous-shaped member whose one end is connected to said take-up spindle and whose other end is connected to said gear wheel, said continuous-shaped member being provided in parallel with said weak resilient spiral spring so as to keep the degree of tightening of the windings of said weak resilient spiral spring at a region where said weak resilient spiral spring does not become into a fully close-wound state at the time that said continuous-shaped member falls into a fully close-wound state.

13. A tension reducer according to claim 12, wherein said continuous-shaped member keeps the degree of tightening of the windings of said weak resilient spiral spring at a region where, said weak resilient spiral spring does not tighten into a fully close-wound state by causing said continuous-shaped member to come into the fully close-wound state, so as to prevent said weak resilient spiral spring from tightening into the fully close-wound state, by being caused by one of rotation of said take-up spindle in the webbing releasing direction by a predetermined number of times, and rotation of said gear wheel in the webbing winding direction by a predetermined number of times under the urging force of said strong resilient spiral spring.

14. A tension reducer according to claim 13, wherein said continuous-shaped member has at least one of the structural features of an overall length or has a number of spiral windings or is set in such a way that said continuous-shaped member comes into a fully close-wound state, to prevent said weak resilient spiral spring from assuming a fully close-wound state.

15. A tension reducer according to claim 14, wherein said continuous-shaped member comprises a tape having a substantially-same width and wound in a spiral manner along the direction of the length thereof.

16. A tension reducer according to claim 11, wherein said keeping means comprises a disc-shaped member connected to said take-up spindle and always rotated together with said take-up spindle, with said take-up spindle serving as a rotating shaft, and a lever member disposed on said disc-shaped member and rotated together with said disc-shaped member at all times, a limiting plate connected to said gear wheel and rotated together with said gear wheel at all times, said limiting plate having a coiled guide groove which receives at least a part of said lever member and which is defined in the same orientation as said weak resilient spiral spring, said lever member and said limiting plate being rotated integrally with each other by causing said lever member at least partially received in said coiled guide groove to reach a terminating portion of said coiled guide groove, thereby making it possible to keep the degree of tightening of the windings of said weak resilient spiral spring within a region where said weak resilient spiral spring does not come into a fully close-wound state, according to the relative rotation between said take-up spindle connected with said lever member and said gear wheel connected with said limiting plate.

17. A tension reducer according to claim 16, wherein said lever member has at least two projections comprising a first projection and a second projection, and said disc-shaped member has a circular hole and a through-hole, said first projection being rotatably fitted in said circular hole, and said second projection extending through said through-hole so as to be movable therein and having a tip portion thereof received in said coiled guide groove, whereby said lever member is swingably rotated about said first projection as a shaft and said second projection is moved while inserted in said coiled guide groove, thereby causing said second projection to reach said terminating portion of said coiled guide groove.

18. A tension reducer according to claim 17, wherein said keeping means serves to keep the degree of tightening of the windings of said weak resilient spiral spring at a region where said weak resilient spiral spring does not come into a fully close-wound state, by causing said second projection received in said coiled guide groove to reach said terminating portion of said coiled guide groove by being caused by one of rotation of said take-up spindle in the webbing releasing direction by a predetermined number of times and rotation of said gear wheel in a webbing winding direction by a predetermined number of times under the urging force of said strong resilient spiral spring.

19. A tension reducer according to claim 18, wherein said the overall length of said coiled guide groove is set in such a manner that said second projection received in said coiled guide groove reaches said terminating portion of said coiled guide groove, for preventing said weak resilient spiral spring from coming into a fully close-wound state.

* * * * *